United States Patent Office 3,203,997
Patented Aug. 31, 1965

3,203,997
SUBSTITUTED POLYPHENYL ETHERS
Clarence L. Mahoney, Berkeley, and Karl J. Sax, Orinda, Calif., assignors to Shell Oil Company, a corporation of Delaware
No Drawing. Filed Dec. 9, 1957, Ser. No. 701,295
4 Claims. (Cl. 260—613)

This invention relates to novel organic polyethers and their preparation. More particularly, the present invention relates to novel organic aromatic polyethers which are thermally stable at high temperatures. The invention relates as well to novel organic aromatic substituted polyethers having radiation-resistant characteristics, and to the preparation of such polyethers.

It is well known that the properties of most organic substances are altered by heating them at high temperatures while they are exposed to air or to oxygen. It is also known that such organic materials are affected by exposure to penetrating ionizing radiation. For example, after substantial neutron or gamma radiation dosages normally soft polyethylene hardens, transparent polymethyl methacrylate darkens, and tough polytetrafluoroethylene becomes brittle. Such alterations of useful physical properties restrict the use of organic materials in high temperature applications, or in the vicinity of radiation sources such as nuclear reactors, particle accelerators and radioisotopes, since in general the changes render the organic substances less useful for their intended application.

Organic liquids are also affected by high temperatures and ionizing radiation. At elevated temperatures oxidation and similar degradation takes place, and large radiation dosages produce, among other effects, decreases in viscosity by bond rupture, or, conversely, increases from radiation-induced polymerization. Solid sludges are frequently formed in irradiated organic liquids, and the production of hydrogen gas therein is not unusual. While most organic liquids are not likely to be employed for applications where they well receive radiation exposures severe enough to cause these changes, for a few types of liquids important to nuclear technology the contrary will be true. Among these types of liquids are organic coolants, hydraulic fluids, liquid moderators, shields and lubricants.

Organic lubricants in particular occupy an important position in nuclear technology, since they are found in many of the mechanisms which are required to operate in areas of high radiation flux. For example, they may be used in small electric motors operating in or near nuclear chain-reacting "piles," or they may be employed in handling devices which are exposed to irradiation from large gamma-ray sources employed for radiation-sterilization or process operations. Inasmuch as an increase in lubricant viscosity or a change of lubricant state from liquid to sludge would render these devices inoperable, it is of considerable importance to have available organic lubricant fluids which are resistant to changes of that nature induced by exposure to ionizing radiation.

An object of this invention is the provision of new composition of matter. Organic compositions having improved stability are further objects of the invention, as are novel radiation-resistant organic liquids. Radiation-resistant lubricants which do not oxidize at high operating temperatures are other objects of the invention, and so are lubricants having low volatility, viscosity and melting and pour points for high temperature applications. A still further object of the invention is the provision of new and useful organic lubricants whose viscosity does not alter after extensive operation at high temperatures in fluxes of ionizing radiation. Novel polyphenyl ethers having these characteristics are particular objects of the invention.

It is known that aromatic compounds are, in general, more stable to ionizing radiation and high temperatures than aliphatic compounds. We have found, however, a unique class of organic aromatic polyethers which are unexpectedly and unusually stable to both ionizing radiation and high temperatures, and which are, because of these characteristics, especially suitable for use as lubricants in devices which operate under such adverse conditions.

The novel compositions of our invention are aromatic polyethers, consisting of from two to six phenylene radicals connected to one another by divalent oxygen atoms, and having as substituents on the aromatic nuclei one to two monovalent radicals selected from a group of monovalent radicals which have been found to have unusually radiation-resistant characteristics. This group consists of the methoxy, alpha cumyl, phenyl, tertiary butyl, tertiary amyl, pivaloxy and dimethyl and trimethyl silyl radicals. The substituents may be attached to either or both of the terminal aromatic nuclei of the polyether molecule, and the molecule may have the same substituents at each end, or the substituents may be different. Similarly, the interior aromatic nuclei may be substituted and the terminal nuclei may not. It may thus be seen that the aromatic polyethers of this invention may or may not be symmetrical with respect to substituent groups on the aromatic nuclei.

The nature of the oxygen linking of the phenylene groups to one another does not appear to be critical. Equally good results have been observed with compositions containing phenylene groups wherein the oxy-linkages were located meta to one another as in molecules wherein the oxy-linkages were para. Oxygen linkages ortho to one another can also be employed. The chain length of the molecules themselves however, has a profound effect on the utility of the aromatic polyethers as lubricants. Compounds having less than two phenylene groups are too volatile and have too low a viscosity to be useful for high temperature lubricant applications, while aromatic ployethers having more than six phenylene nuclei interconnected with divalent oxy linkages are to viscous to be suitable lubricants. The most suitable polyethers are those having from 3 to 5 phenylene groups, interconnected by 2 to 4 divalent oxygen linkages.

In discussing the aromatic polyethers of this invention, the term "phenylene," which refers to the divalent aromatic radical —$C_6H_4$—, will be used to refer to both the internal radicals on the polyether chain and to the terminal radicals. However, it should be understood that since some of the aromatic nuclei may have two designated substituents as well as the oxy linkages connecting them to the remainder of the molecule, the term "phenylene" when used to designate the nuclei also includes the trivalent aromatic phenenyl radical —$C_6H_3$=, and the tetra-substituted aromatic radical =$C_6H_2$= so that in addition to the oxy connectives there are two sites available for substitution. Moreover, since in some cases the terminal aromatic nuclei have only hydrogen substituents, the term "phenylene" applied to them will include the term "phenyl," meaning the monovalent aromatic radical $C_6H_5$—.

With respect to the substituents on the terminal aromatic nuclei of the polyether molecule, it has been found that most —CH and —$CH_2$— groups connected directly to the terminal group yield compounds having unsatisfactory oxidation stability. However, we have unexpectedly found that exceptions to this general behavior occur when a carbon atom linked directly to the terminal aromatic nucleus is completely substituted with monovalent radicals selected from the group consisting of the methyl, ethyl and phenyl radicals. Thus, substituent radicals which do not impair the oxidation stability of the resultant aromatic polyether are the tertiary butyl radical

the tertiary amyl radical

and the α-cumyl radical

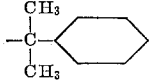

Although the aliphatic alkyl substituents, when added to the aromatic polyether chain, do not afford radiation-stable molecules, the phenyl group $C_6H_5$— may be added to the chain to yield a molecule having desirable properties. For example, the compounds 1-(o-phenyl phenoxy) 4-phenoxy benzene

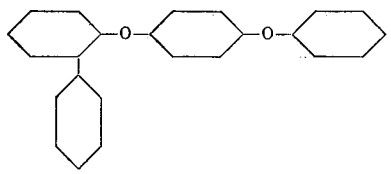

and 4-phenoxy-2-phenyl phenoxy benzene

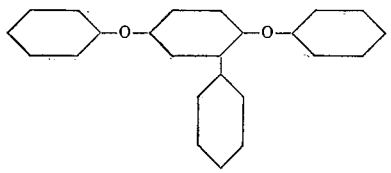

has been found to be suitable as high-temperature radiation-resistant lubricants. Moreover, the phenyl radical may also be associated on the terminal phenylene nucleus with such other substituents as the tertiary butyl radical, as in the case of the compound bis[p-(2-phenyl-4-tert. butylphenoxy)phenyl]ether.

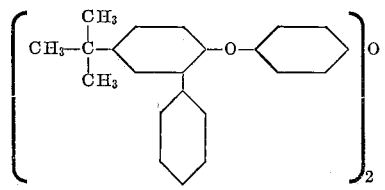

The methyl radical, which yields an insufficiently stable molecule when linked directly to a phenylene radical of the aromatic polyether chain, affords satisfactory radiation and oxidation resistance when it is connected to the phenylene group by a divalent oxygen linkage. The methoxy group, $CH_3$—O—, may therefore be regarded as a suitable substituent to the polyether chain where the directly-linked methyl group may not.

One other class of substituents, the methylsilyl radicals, yield aromatic polyethers having suitable properties for use as high temperature radiation-resistant lubricants. Thus, trimethylsilyl radicals

may be substituted on the phenylene group of the polyphenyl ether chain to provide molecules having the desired characteristics.

Illustrative examples of the substituted and unsubstituted aromatic polyethers of this invention, and which are suitable for employment as high temperature radiation-resistant lubricants are:

(1) 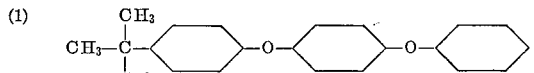

1-(p-tert. butyl phenoxy)-4-phenoxy benzene (2) 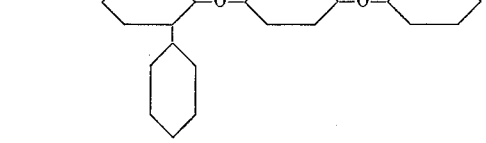

1-(o-phenyl phenoxy)-4-phenoxy benzene (3) 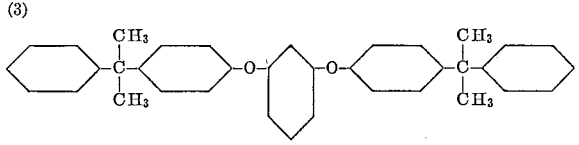

m-Bis(p-α-cumyl phenoxy)benzene (4) 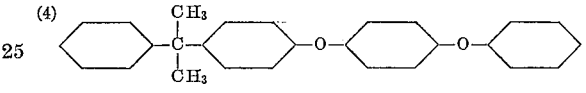

1-(p-α-cumyl phenoxy)-4-phenoxy benzene (5) 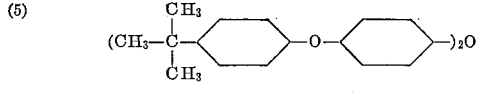

Bis[p-(p-tert-butylphenoxy)phenyl]ether (6) 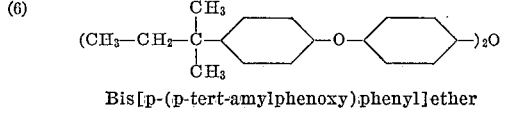

Bis[p-(p-tert-amylphenoxy)phenyl]ether (7) 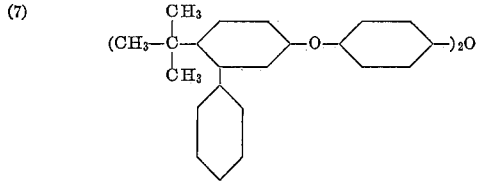

Bis[p-(o-phenyl-p-tert butylphenoxy)phenyl]ether (8) 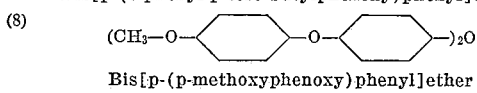

Bis[p-(p-methoxyphenoxy)phenyl]ether (9) 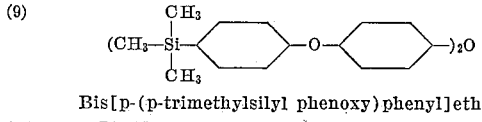

Bis[p-(p-trimethylsilyl phenoxy)phenyl]ether

(10) 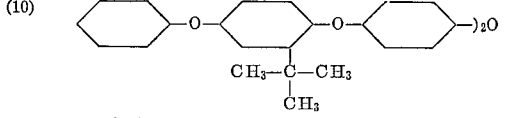

4-phenoxy-2-tert-butyl-phenoxy benzene

While various methods are available for the preparation of the organic polyethers of this invention, the preferred procedure is that involving the reaction of an alkali metal phenate with an aryl halide in the presence of a copper catalyst. This method, known as the Ullman ether synthesis, is described in the literature, as, for example, by R. B. Wagner and H. D. Zook, "Synthetic Organic Chemistry," John Wiley and Sons, New York, 1953, at page 227.

While any alkali metal phenate, such as sodium or cesium compounds, could be employed, potassium phenates were used in the synthesis because they were the most convenient. Similarly, aryl bromides are preferred to other aryl halides, since they are somewhat more reactive and require no activation of the halo group as do, for example, aryl chlorides. In general, a 5–10% excess of the potassium phenate was employed to ensure absence of bromo compound in the polyphenyl ether product, and in all cases an excess of the appropriate phenol was present.

The ether synthesis reaction may be conducted over a wide range of temperatures, but in general temperatures of between 200° C. and 250° C. were found to be convenient. After the reaction of the potassium phenate and the aryl bromide was complete, the phenyl ether reaction product was readily purified by pouring the hot reaction mixture into an aromatic hydrocarbon solvent, such as toluene or xylene, and filtering off the potassium bromide reaction product. The excess phenol was easily removed by such well-known methods as extraction with 20% aqueous potassium hydroxide, and the remaining toluene solution water-washed to remove residual water-soluble or inorganic components. The phenyl ethers were then separated from the solution by distillation.

Physical properties of representative substituted polyphenyl ethers prepared in this manner are presented in the following table:

| Compound | Melting point, °C. | Boiling point, °C. |
| --- | --- | --- |
| 1-(p-tert-butylphenoxy)-4-phenoxybenzene | 54–56 | 182–186 <1 mm. |
| 1-(o-phenylphenoxy)-4-phenoxybenzene | 87–87.5 | 195–228 <1 mm. |
| Bis[m-p-alpha-cumylphenoxy)]benzene | (¹) | 300 0.5 mm. |
| 1-(p-alpha-cumylphenoxy)-4-phenoxybenzene | 55–56 | 230–234 0.5 mm. |
| Bis[p-(p-tert-butylphenoxy)phenyl]ether | 79.5–81 | 292–300 1 mm. |
| Bis[p-(p-tert-amylphenoxy)phenyl]ether | | 285–295 0.3 mm. |
| Bis[p-(o-phenyl-p-tert-butylphenoxy)phenyl]ether | | 330–335 0.1 mm. |

¹ Oil at room temp.

The following examples will illustrate the procedures which may be employed to obtain the products of our invention. It should be understood, however, that the examples are merely illustrative and are not to be regarded as limitations to the appended claims, since the basic teachings therein may be varied as will be understood by one skilled in the art. In the examples, the ingredients are expressed in parts by weight unless otherwise indicated.

EXAMPLE I

*Preparation of bis[p-(p-α-cumylphenoxy)phenyl]ether*

A mixture was made of 56.8 parts of para-α-cumyl phenol and 8.4 parts of 86% potassium hydroxide solution, and the mixture was heated in intimate admixture with 2 parts of a finely-divided metallic copper catalyst. When the melt was uniform at 180° C., 16.4 parts of bis(p-bromophenyl)ether were added and the mixture was heated at 240° C. and maintained at that temperature for several hours. When all evidence of reaction appeared to have ceased, the mixture was allowed to cool to 150° C., whereupon it was poured into toluene and the resulting solution was extracted with aqueous potassium hydroxide solution to remove any excess phenol.

The toluene solution was then washed with water and dried over magnesium sulfate. It was then filtered, and the toluene was removed by evaporation under reduced pressure. The residue was vacuum distilled, 24.5 parts of the main fraction being recovered at 360°–370°C. at a pressure of less than 1 mm. This product, which was identified as

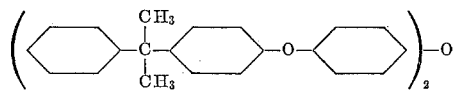

was a glass at temperatures below about 20° C.

Analytical results were as follows:

| | Percent C | Percent H |
| --- | --- | --- |
| Calculated for C₄₂H₃₈O₃ (M.W. 590.72) | 85.39 | 6.48 |
| Found | 85.4 | 6.6 |

EXAMPLE II

*Preparation of bis[p-tert-amylphenoxy)phenyl]ether*

A mixture of 198 parts of p-tert-amyl phenol and 65 parts of potassium hydroxide was prepared and heated with 0.5 parts of finely-divided metallic copper catalyst. When a uniform melt was obtained at 180° C., 115 parts of bis(p-bromophenyl)ether were added and the mixture was maintained at temperatures between 200° C. and 300° C. for three hours. It was then cooled to about 150° C. and poured into toluene, and excess phenol removed by extraction with aqueous potassium hydroxide solution. After drying over magnesium sulfate and filtering, the solution was evaporated under reduced pressure to remove the toluene, and the residue was vacuum distilled. The main fraction, of which 42 parts were recovered, came over at 285°–295° C. under 0.3 mm. pressure. The product was identified as

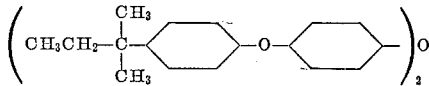

The analytical results therefor were as follows:

| | Percent C | Percent H |
| --- | --- | --- |
| Calculated for C₃₄H₃₈O₃ (M.W. 494.64) | 82.55 | 7.74 |
| Found | 82.6 | 7.8 |

EXAMPLE III

*Preparation of bis[p-(p-tert-butyl o-phenylphenoxy)phenyl]ether*

As in the previous examples, a melt was prepared from a mixture of 213.5 parts by weight of 2-phenyl-4-tert butyl phenol, 61 parts of potassium hydroxide and 5 parts of finely divided copper metal catalyst. When the melt temperature reached about 200° C. 131 parts by weight of bis(p-bromophenyl)ether was added, and the reaction mixture was held for two hours at temperatures between 270° C. and 340° C. It was then cooled to about 150° C. and poured into toluene. The toluene solution was purified of excess phenol, water and undissolved solids as in the previous examples, and the toluene removed by evaporation under reduced pressure. The residue was vacuum distilled, and 100 parts thereof came over at 330–335° C. under 0.1 mm. pressure. This product was identified as

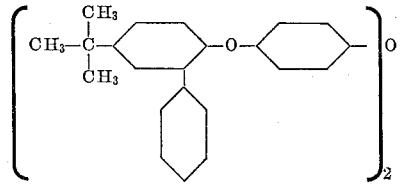

and its analytical results were as follows:

| | %C | %H |
| --- | --- | --- |
| Calculated for C₄₄H₄₂O₃ (M.W. 618.78) | 85.40 | 6.84 |
| Found | 85.8 | 6.9 |

EXAMPLE IV

*Preparation of 1-(p-tert-butylphenoxy)-4-phenoxybenzene*

A melt was prepared from a mixture of 150 parts of p-tert-butyl phenol and 52 parts of potassium hydroxide, containing as well 10 parts of finely-divided metallic copper catalyst. When the melt temperature was around 200° C., 174.3 parts of p-bromophenyl phenyl ether was added, and the reaction mixture was maintained at 240–260° C. for two hours, until all evidence of reaction had ceased. The mixture was then cooled and dissolved in xylene. The resulting xylene solution was filtered, extracted wtih aqueous potassium hydroxide and dried over magnesium sulfate. The xylene was then distilled off under reduced pressure and the residue vacuum distilled. The main product came over at 182–186° C. at a pressure of less than 1 mm., and was identified as

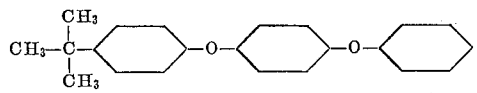

The analytical results were as follows:

|  | Percent C | Percent H |
|---|---|---|
| Calculated for C22H22O2 )M.W. 318.40) | 82.98 | 6.97 |
| Found | 83.0 | 6.9 |

EXAMPLE V

*Preparation of 1-(ortho-phenylphenoxy)-4-phenoxybenzene*

Sodium o-phenyl phenate was prepared and 272 parts thereof was mixed with xylene, 189.2 parts of p-bromophenyl ether, and 10 parts of copper catalyst. The mixture was maintained between 275–300° C. for four hours with occasional agitation, and at the end of that time it was cooled and poured into xylene. The resulting solution was purified as in the previous examples and the xylene evaporated off. The residue was vacuum distilled to yield 196 parts of a product coming over at 195–228° C. at less than 1 mm. and which was identified as

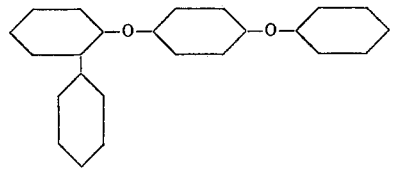

and analysis of the product gave the following results:

|  | Percent C | Percent H |
|---|---|---|
| Calculated for C24H18O2 (M.W. 338.38) | 85.18 | 5.36 |
| Found | 85.2 | 5.4 |

EXAMPLE VI

*Preparation of 1-(p-α-cumylphenoxy)-4-methoxy benzene*

As in the examples described above, a potassium salt was prepared from 283 parts of p-α-cumyl phenol and 65 parts of 85% aqueous potassium hydroxide, and the resulting salt heated with 20 parts of fresh copper catalyst and 159 parts of p-bromoanisole. The product thus obtained was purified as in the prior examples and distilled at 185–189° C. under 1 mm. pressure to yield 182 parts of a compound identified as

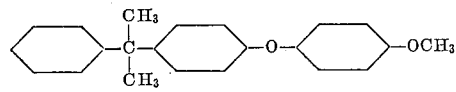

The analytical results therefor were as follows:

|  | Percent C | Percent H |
|---|---|---|
| Calculated for C22H22O2 (M.W. 318.4) | 82.98 | 6.97 |
| Found | 83.12 | 6.99 |

EXAMPLE VII

*Preparation of [bis p-(m-methoxyphenoxy)-phenyl]ether*

To a reaction vessel was added 199 parts of m-methoxy phenol and 94 parts of potassium hydroxide as an 85% aqueous solution. The mixture was heated under a nitrogen atmosphere until the mixture was homogeneous and approximately 10 parts of copper catalyst was added. To the resulting mixture was added 184 parts of dibromodiphenyl ether, while the reaction was heated and stirred. The temperature thereof was maintained at 275° C. for an hour, then reduced to 140° for about fourteen hours. The resulting dark mass was poured into toluene and purified as in the previous examples to yield 43 parts of a product which was distilled between 215–265° C. at 0.3 mm. and was identified as

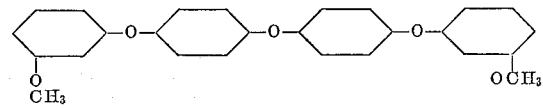

The analytical results therefor were as follows:

|  | Percent C | Percent H | Percent OCH3 |
|---|---|---|---|
| Calculated for C26H22O5 | 75.4 | 5.3 | 15 |
| Found | 74.6 | 5.3 | 13 |

EXAMPLE VIII

*Preparation of 1-(p-α-cumylphenoxy)-4-pivaloxybenzene*

A mixture of 160 parts of 1-(p-α-cumylphenoxy)-4-hydroxybenzene dissolved in 150 parts of toluene and of 68 parts of pivalyl chloride dissolved in 160 parts of pyridine was prepared and refluxed at 110–120° C. for about 6 hours. The resulting mixture was poured while hot into an aqueous hydrochloric acid-ice mixture and the yellow organic layer separated and washed. The organic liquid was then dried over magnesium sulfate and filtered, and the toluene evaporated off. The residue was distilled under pressure to yield a product having a boiling point of 204° C. at 0.25 mm. The yield thereof was 171 parts of a compound identified as

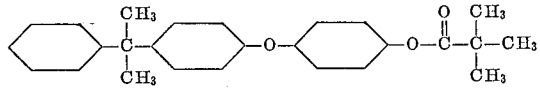

Upon analysis, the following results were obtained:

|  | Percent C | Percent H |
|---|---|---|
| Calculated for C26H28O3 | 80.4 | 7.3 |
| Found | 80.8 | 7.3 |

EXAMPLE IX

*Preparation of 4-phenoxy-2-tert-butyl-phenoxy benzene*

A phenol-sodium phenate mixture prepared from 282 parts of phenol and 96 parts of sodium hydroxide, reacted together in the presence of 5 parts of divided copper catalyst at temperatures from 200–250° C. To this mixture is added 292 parts of 1-tert-butyl-2,5-dibromobenzene, in several portions. After four hours, the resulting mixture is poured into toluene, filtered, and the phenol extracted with aqueous NaOH solution. After purification as in the previous examples, the resulting compound is a product boiling at about 160° C. at around 0.2 mm. and having the structural formula

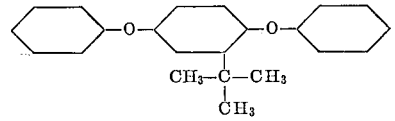

By using as a starting material 1-phenyl-2,5-dibromobenzene in place of the tert butyl compound, the corresponding phenyl compound, 4-phenoxy-2-phenyl-phenoxy benzene may be readily prepared in the same manner.

EXAMPLE X

In order to determine the stability toward oxidation at high temperatures of the polyphenyl ethers that are the subject of this invention, a series of experiments were conducted wherein samples of several compounds were heated in contact with copper wire at approximately 204° C., while oxygen was circulated through the liquid. The oxygen absorption rates for several of the polyphenyl ethers and similar lubricants is shown below in Table I.

TABLE I

R—⬡—O—⬡—O—⬡—O—⬡—R

| Parent compound: Substituent R | Time to absorb 0.5 mole of $O_2$/500 g. of compound, hr |
|---|---|
| $CH_3-\underset{\underset{CH_3}{\mid}}{\overset{\overset{CH_3}{\mid}}{C}}-$ | 350 |
| $C_6H_5-\underset{\underset{CH_3}{\mid}}{\overset{\overset{CH_3}{\mid}}{C}}-$ | 200 |
| $CH_3-CH_2-\underset{\underset{CH_3}{\mid}}{\overset{\overset{CH_3}{\mid}}{C}}-$ | 60 |
| $CH_3-$ | 5 |
| $CH_3-(CH_2)_x-\underset{\underset{CH_3}{\mid}}{\overset{\overset{CH_3}{\mid}}{C}}-$ | 5 |
| Di-isooctyl phthalate | 1.2 |

Table II presents data from a similar test run at 232° C.

TABLE II

R—⬡—O—⬡—O—⬡—O—⬡—R

| Parent compound: Substituent R | Time to absorb 0.5 mole of $O_2$/500 g. of compound, hr |
|---|---|
| $CH_3-\underset{\underset{CH_3}{\mid}}{\overset{\overset{CH_3}{\mid}}{C}}-$ | 97 |
| $C_6H_5-\underset{\underset{CH_3}{\mid}}{\overset{\overset{CH_3}{\mid}}{C}}-$ | 80 |
| $CH_3-CH_2-\underset{\underset{CH_3}{\mid}}{\overset{\overset{CH_3}{\mid}}{C}}-$ | 10 |
| $CH_3-$ | 1.5 |
| Di-2-ethylhexyl sebacate-based jet engine lubricant | 2.5 |

EXAMPLE XI

Measurements were made of the effects of radiation and temperature on two of the polyphenyl ethers of this invention. The results thereof appear in Table III below. The samples were irradiated with the gamma rays from a $Co^{60}$ source while heated to 204° C. and maintained under a nitrogen atmosphere.

TABLE III

| Compound | Dose, rad. | Time, hr. | Viscosity, cs. 99° C. | Viscosity, cs. 204° C. |
|---|---|---|---|---|
| Bis[p-(tert butylphenoxy) phenyl] ether | 0 | 0 | 31.4 | 3.17 |
| | $6.3 \times 10^7$ | 363 | 32.6 | 3.17 |
| | $1.0 \times 10^8$ | 595 | 34.0 | 3.51 |
| Bis[p-(p-α-cumylphenoxy) phenyl] ether | 0 | 0 | 116 | 6.40 |
| | $6.3 \times 10^7$ | 363 | 123 | 6.38 |
| | $1.0 \times 10^8$ | 595 | 124 | 7.04 |

EXAMPLE XII

Using a Shell four-ball wear-testing device, the high-temperature lubricating qualities of several of the polyphenyl ethers of this invention were measured. The tests were made at a temperature of 204° C. and were run with steel balls for an hour for each test. The results of the tests appear as Table IV.

TABLE IV

| | Wear scar diameter, mm. (Load, kg.) | | | |
|---|---|---|---|---|
| | 2 | 10 | 20 | 40 |
| Bis[p-(p-tert butylphenoxy)-phenyl]ether | 0.39 | 0.50 | 0.63 | 0.83 |
| Bis[p-(p-tert-amylphenoxy)-phenyl]ether | ---- | 0.59 | 0.77 | 0.98 |
| m-Bis-(p-α-cumylphenoxy) benzene | ---- | 0.52 | 0.67 | 0.88 |
| 1-(p-α-cumylphenoxy)-4-methoxy-benzene | ---- | 0.48 | ---- | 0.71 |
| Petroleum white oil | 0.25 | 0.53 | 0.93 | 0.97 |

We claim as our invention:
1. Bis[p-(o-phenyl-p-tert-butylphenoxy)phenyl]ether.
2. Bis[p-(p-alpha-cumylphenoxy)phenyl]ether.
3. m-Bis-(p-alpha-cumylphenoxy)benzene.
4. Bis[p-(p-tertiary-butyl phenoxy)phenyl]ether.

References Cited by the Examiner

UNITED STATES PATENTS

| | | | |
|---|---|---|---|
| 1,932,595 | 10/33 | Muth et al. | 260—613 |
| 2,149,789 | 3/39 | Rittler et al. | 252—73 |
| 2,347,393 | 4/44 | Bousquet et al. | 260—613 |
| 2,602,780 | 7/52 | Zisman et al. | 252—73 |
| 2,628,242 | 2/53 | Clark | 260—448.2 |

OTHER REFERENCES

Blake et al.: High-Temperature Hydraulic Fluids, WADC Technical Report 54-532; Part III, ASTIA Document No. AD 118179, April 1957, page 41.

Janssen et al.: "Jour. Org. Chem.," vol. 20, No. 10, October 1955, pp. 1327 and 1329.

McGregor: "Silicones and Their Uses," McGraw-Hill Book Co., Inc., N.Y., publishers (1954), page 243.

Staudinger et al.: "Annalen," volume 517 (1935), pages 67–72.

LEON ZITVER, *Primary Examiner.*

ALLAN M. BOETTCHER, CHARLES B. PARKER,
*Examiners.*